United States Patent
Mori

(10) Patent No.: US 9,242,209 B2
(45) Date of Patent: Jan. 26, 2016

(54) SEPARATION OF COMPONENTS FROM A GAS MIXTURE

(71) Applicant: Yasushi Mori, Hiroshima (JP)

(72) Inventor: Yasushi Mori, Hiroshima (JP)

(73) Assignee: BP Alternative Energy International Limited (GB)

( * ) Notice: Subject to any disclaimer, the term of this patent is extended or adjusted under 35 U.S.C. 154(b) by 189 days.

(21) Appl. No.: 14/060,142

(22) Filed: Oct. 22, 2013

(65) Prior Publication Data

US 2014/0112855 A1  Apr. 24, 2014

(30) Foreign Application Priority Data

Oct. 22, 2012 (GB) .................................. 1218949

(51) Int. Cl.
| | |
|---|---|
| *B01D 53/14* | (2006.01) |
| *B01D 53/34* | (2006.01) |
| *B01D 53/52* | (2006.01) |
| *B01D 53/78* | (2006.01) |
| *B01D 53/18* | (2006.01) |

(52) U.S. Cl.
CPC .......... *B01D 53/526* (2013.01); *B01D 53/1425* (2013.01); *B01D 53/1462* (2013.01); *B01D 53/18* (2013.01); *B01D 2252/204* (2013.01); *B01D 2252/2021* (2013.01); *B01D 2256/245* (2013.01)

(58) Field of Classification Search
CPC ............... B01D 53/14; B01D 53/1468; B01D 53/1475; B01D 53/343; B01D 53/526; B01D 53/78
See application file for complete search history.

(56) References Cited

U.S. PATENT DOCUMENTS

| | | | |
|---|---|---|---|
| 7,906,087 B2 * | 3/2011 | Aroonwilas et al. | .......... 423/210 |
| 8,080,089 B1 | 12/2011 | Wen et al. | |

(Continued)

FOREIGN PATENT DOCUMENTS

| | | |
|---|---|---|
| EP | 2511001 A1 | 10/2012 |
| EP | 2529824 A1 | 12/2012 |

(Continued)

OTHER PUBLICATIONS

Search Report Dated Aug. 6, 2013 for British Application No. GB1218949.4 (6 p.).

(Continued)

*Primary Examiner* — Timothy Vanoy
(74) *Attorney, Agent, or Firm* — Gunnar Heinisch

(57) ABSTRACT

This invention relates to the separation of components from a gas mixture. Aspects of the invention relate to the separation of components, for example carbon dioxide ($CO_2$) and/or hydrogen sulphide ($H_2S$) from, for example, acid gas, for example natural gas, syngas or process gas although features of the invention may be applied to other source gases. Such a process is sometimes referred to as acid gas removal (AGR). In examples described herein, the source gas mixture contains $CO_2$ and/or $H_2S$ in addition to other components and in some examples, the $CO_2$ and/or $H_2S$ components of the gas are referred to as acid gas components. In examples of the invention, some or all of the acid gas component is removed using a solvent absorption method; some examples described use a chemical absorption system (for example including N-Methyl diethanolamine (MDEA)), and others use a physical solvent (for example based on methanol (MeOH)).

18 Claims, 10 Drawing Sheets

(56) References Cited

U.S. PATENT DOCUMENTS

| | | | |
|---|---|---|---|
| 8,529,678 B2 * | 9/2013 | Iijima et al. | 96/234 |
| 2007/0221065 A1 * | 9/2007 | Aroonwilas et al. | 96/243 |
| 2010/0104490 A1 * | 4/2010 | Bouillon et al. | 423/223 |
| 2010/0132554 A1 | 6/2010 | Huang et al. | |
| 2014/0041523 A1 * | 2/2014 | Tsujiuchi et al. | 96/218 |

FOREIGN PATENT DOCUMENTS

| | | |
|---|---|---|
| JP | 2012000538 A | 1/2012 |
| WO | 2004/005818 A2 | 1/2004 |
| WO | 2004/052511 A1 | 6/2004 |
| WO | 2004/073838 A1 | 9/2004 |
| WO | 2010/039785 A1 | 4/2010 |
| WO | 2011/121635 A1 | 10/2011 |
| WO | 2011/122559 A1 | 10/2011 |

OTHER PUBLICATIONS

Search Report Dated Feb. 14, 2013 for British Application No. GB1218949.4 (7 p.).

* cited by examiner

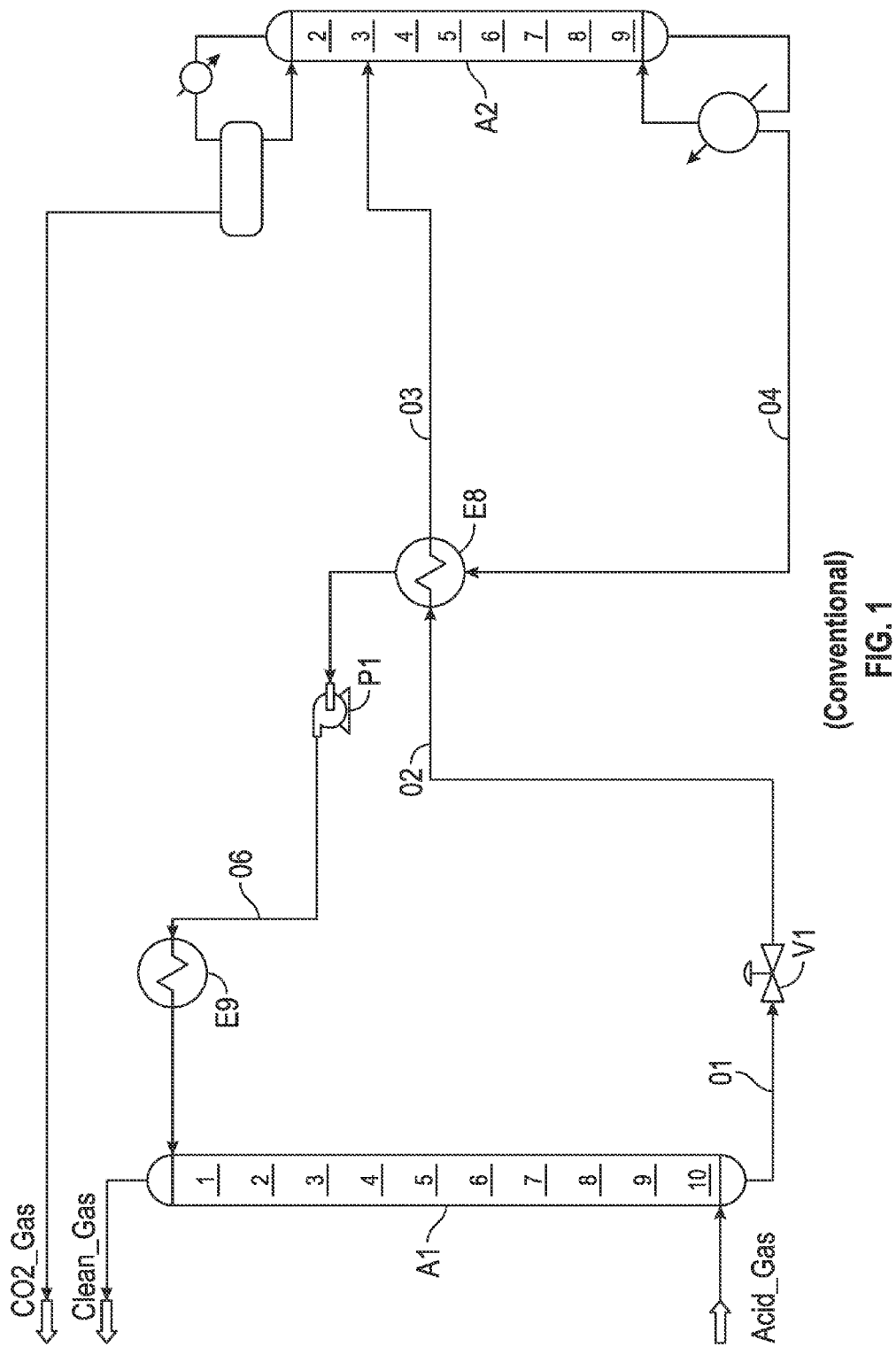
FIG. 1
(Conventional)

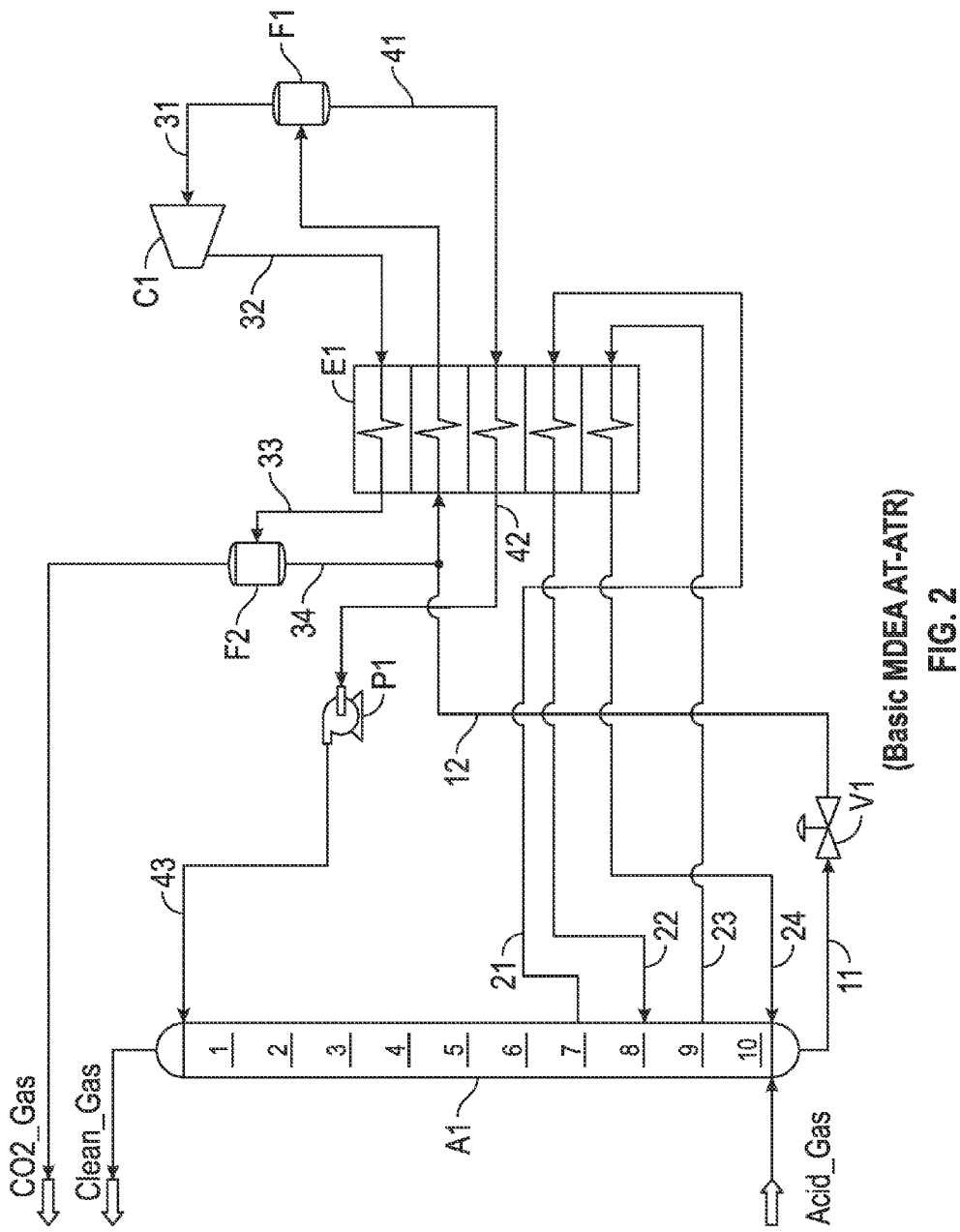
FIG. 2 (Basic MDEA AT-ATR)

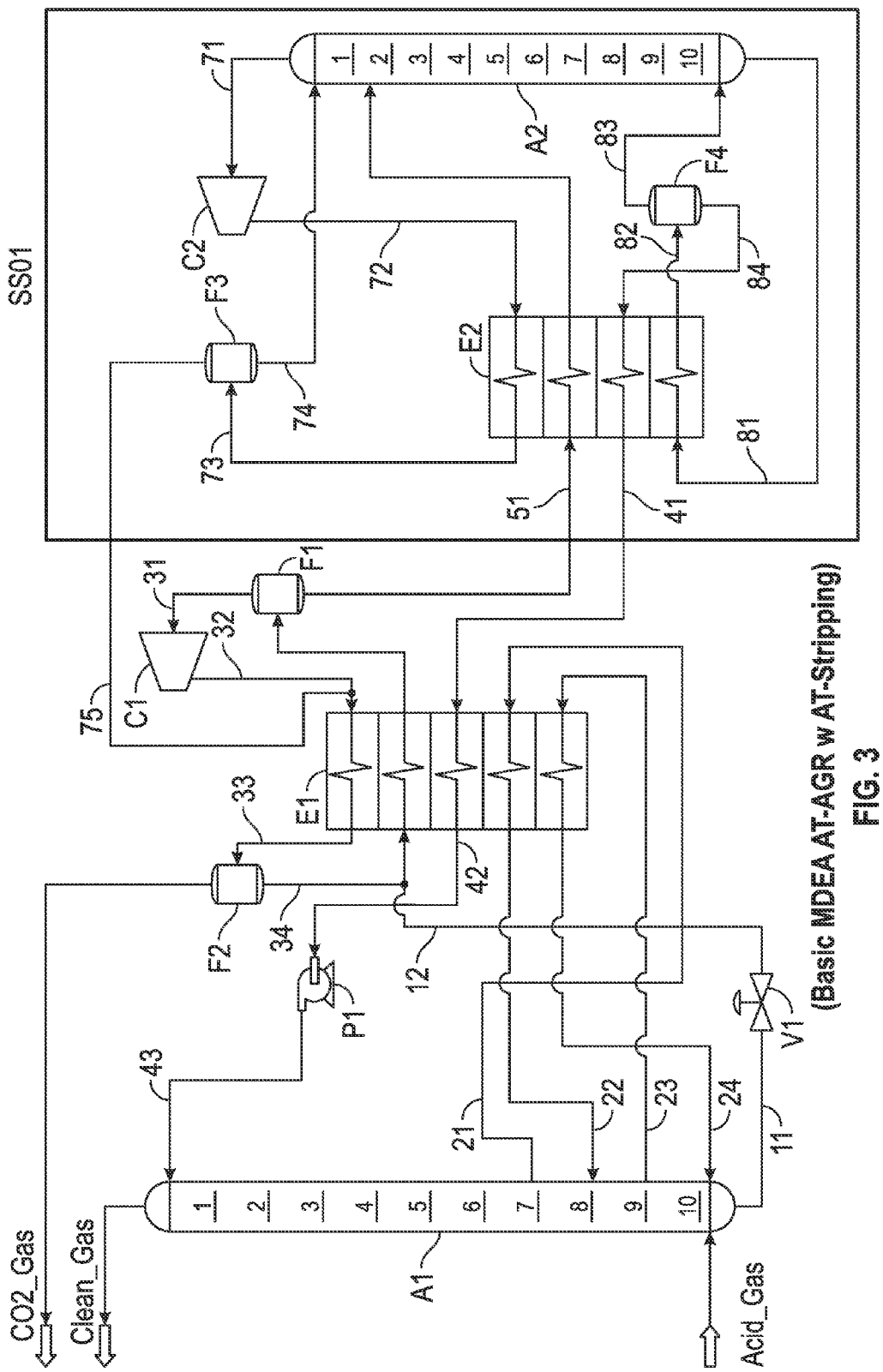
FIG. 3 (Basic MDEA AT-AGR w AT-Stripping)

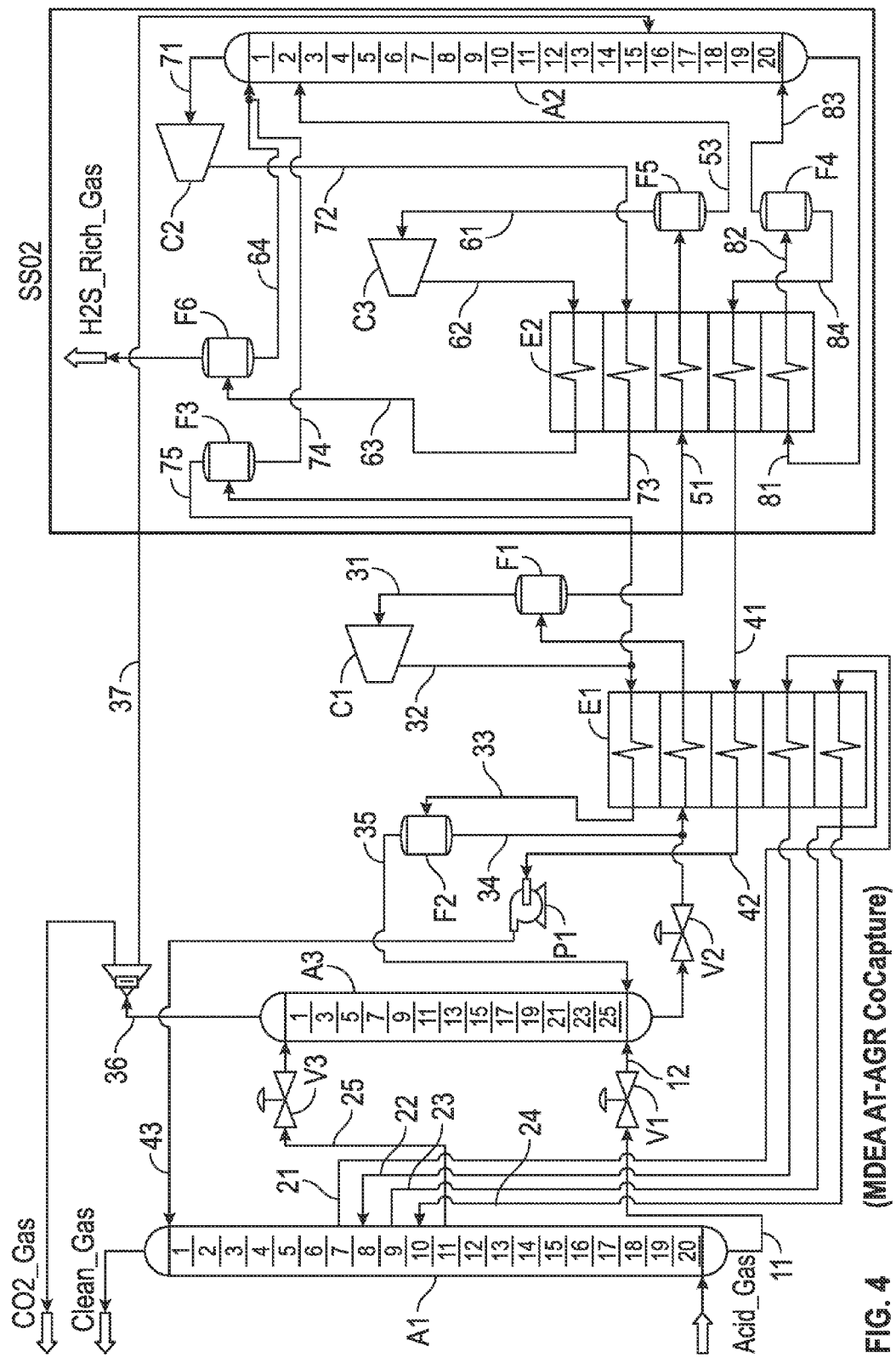
FIG. 4 (MDEA AT-AGR CoCapture)

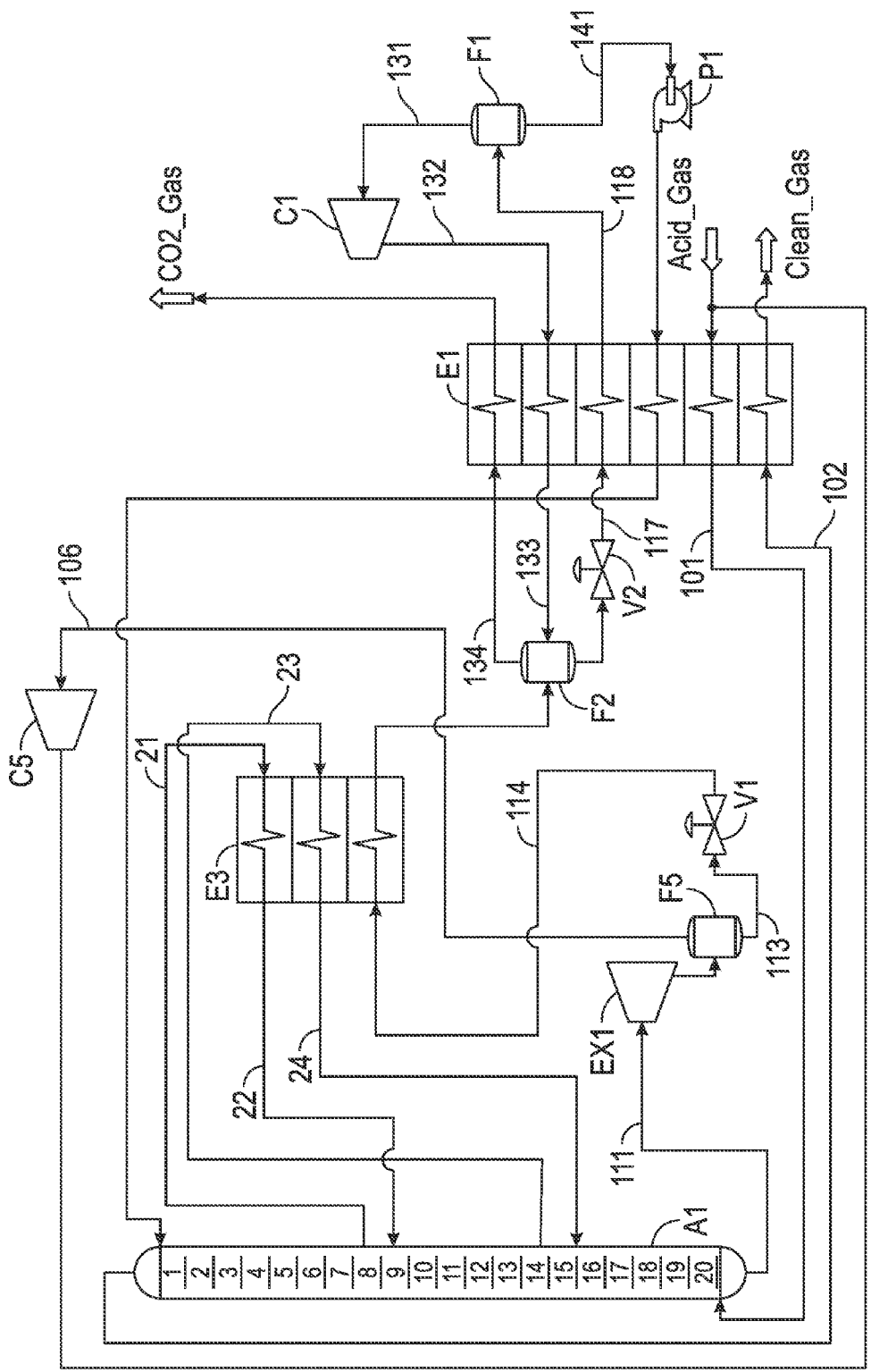
FIG. 5 (Basic MeOH AC-AGR)

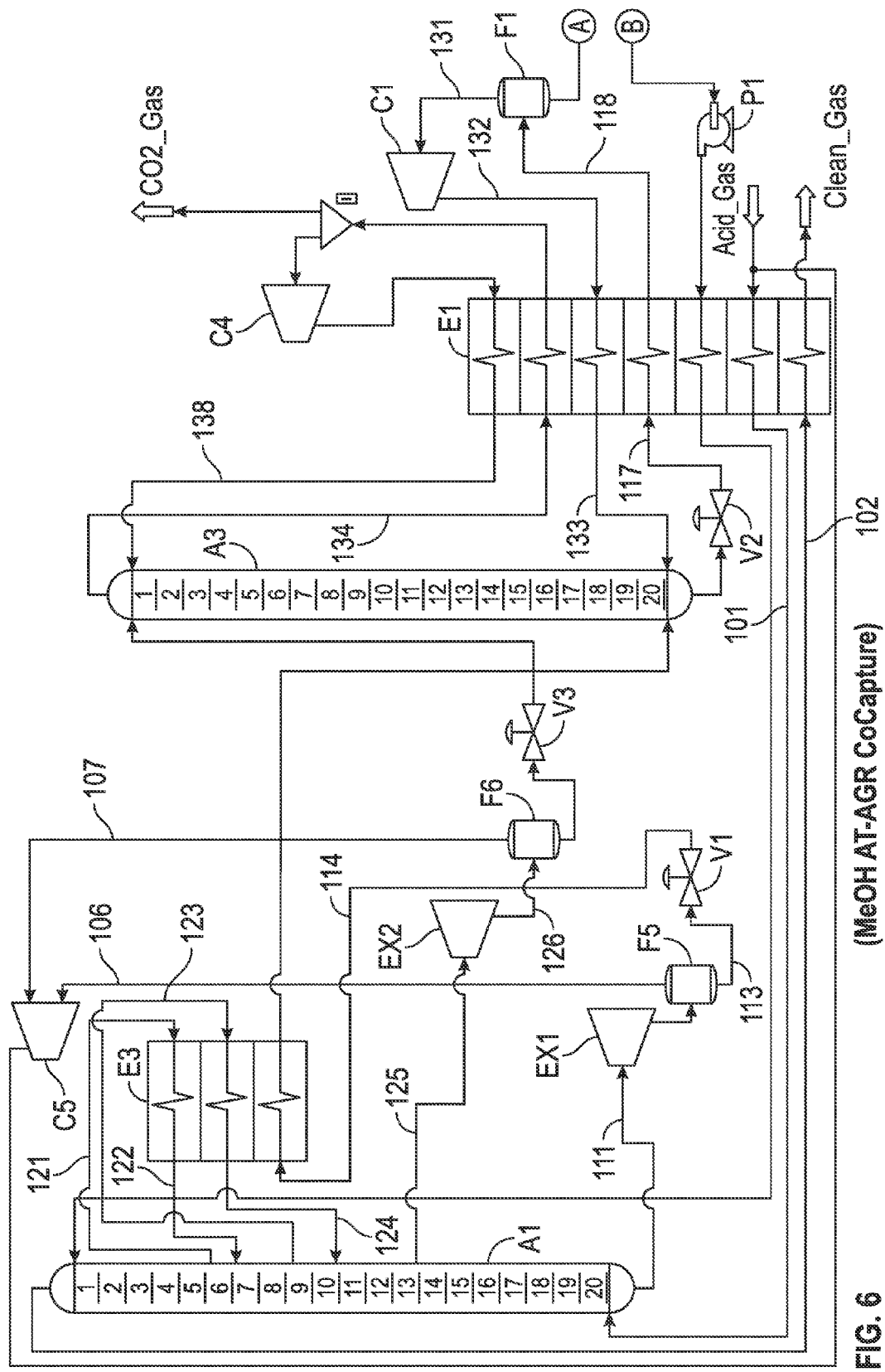
FIG. 6 (MeOH AT-AGR CoCapture)

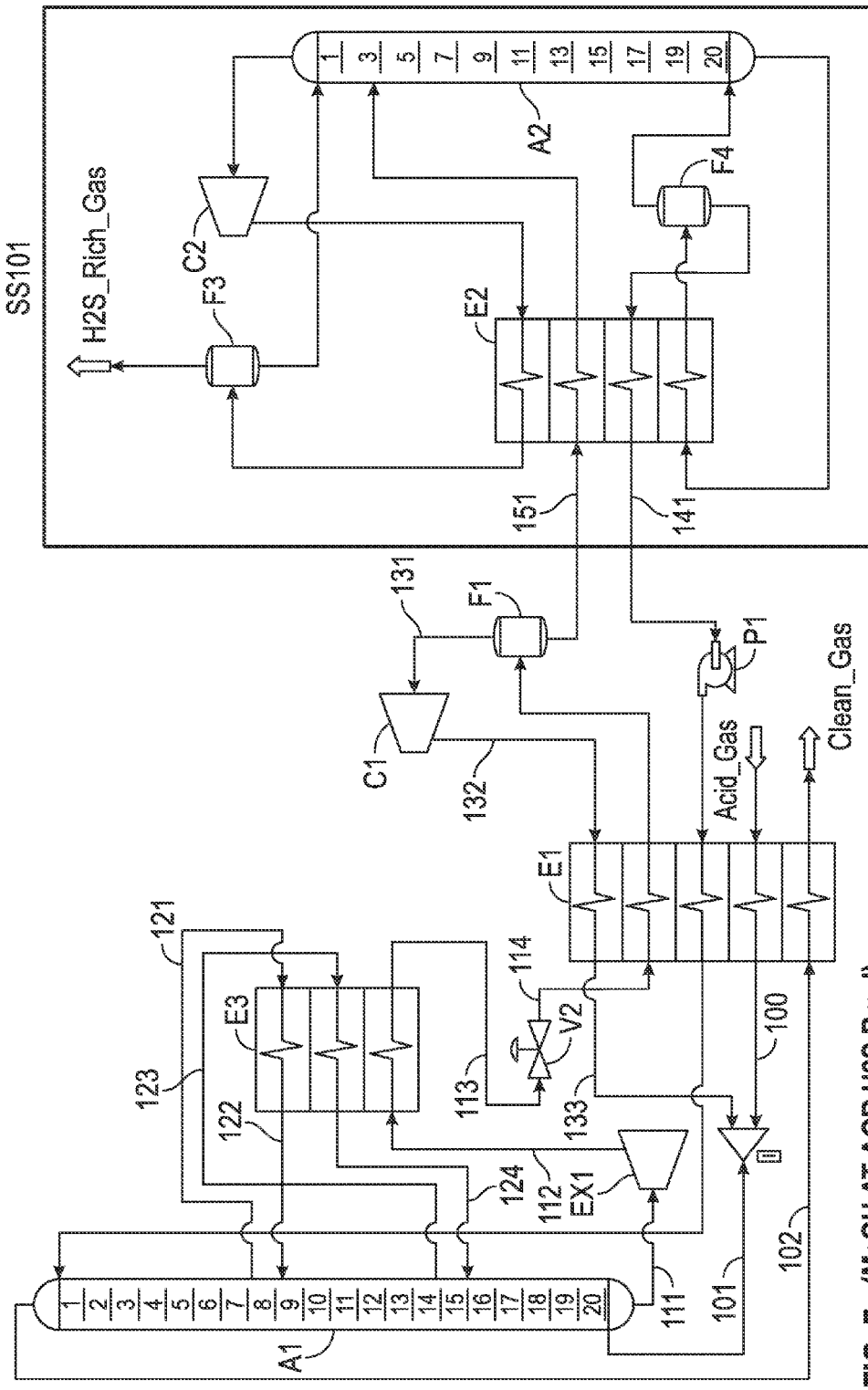
FIG. 7 (MeOH AT-AGR H2S Rmvl)

SEPARATION OF COMPONENTS FROM A GAS MIXTURE

CROSS-REFERENCE TO RELATED APPLICATIONS

This application claims benefit of U.K. Patent Application No. GB 1218949.4 filed Oct. 22, 2012, and entitled "Separation of Components from a Gas Mixture," which is hereby incorporated herein by reference in its entirety.

STATEMENT REGARDING FEDERALLY SPONSORED RESEARCH OR DEVELOPMENT

Not applicable.

BACKGROUND

This invention relates to the separation of components from a gas mixture. Aspects of the invention relate to the separation of components, for example carbon dioxide ($CO_2$) and/or hydrogen sulphide ($H_2S$) from, for example, acid gas, for example natural gas, syngas or process gas although features of the invention may be applied to other source gases. Such a process is sometimes referred to as acid gas removal (AGR). In examples described herein, the source gas mixture contains $CO_2$ and/or $H_2S$ in addition to other components and in some examples, the $CO_2$ and/or $H_2S$ components of the gas are referred to as acid gas components. In examples of the invention, some or all of the acid gas component is removed using a solvent absorption method; some examples described use a chemical absorption system (for example including N-Methyl diethanolamine (MDEA)), and others use a physical solvent (for example based on methanol (MeOH)).

Physical absorption, chemical absorption and cryogenic AGR processes transform acid gas component into liquid form by absorption of the acid gas component, for example $CO_2$, by an absorbent. This process is exothermic. Conversely, the process for regeneration of the absorbent transforms the liquid phase acid gas component into gaseous form and this process is endothermic.

Conventional absorption AGR requires an external heat source and/or cooling for operation. For example in a typical chemical absorption AGR system based on MDEA, acid gas component, for example $CO_2$, is absorbed by MDEA solution in an absorption column. A considerable amount of external steam and cooling water is then required for the stripping process to remove the acid gases from the MDEA.

Physical solvent systems include the conventional Rectisol (RTM) process which is based on the use of a methanol (MeOH) as solvent. In the conventional Rectisol process, refrigerated MeOH is used as a solvent for physical absorption of the acid gas components. The acid gas components are absorbed by the MeOH in a low temperature absorption column at a relatively high pressure. The acid gas components are then subsequently desorbed from the solvent by reducing the pressure of the solvent, stripping and, if necessary, reboiling the solvent. A system for heating and cooling various sections of the process is required for its operation. For example, inlet gas is cooled down through a heat exchanger upstream of the methanol solvent, and gas exiting the process is used as a coolant. External refrigeration, for example using propane or ammonia, is required to maintain the column at a low temperature by absorbing the heat generated in the column. External steam and cooling water is also required for the stripper for removal of absorbed components from the MeOH.

The external heating and/or cooling in the conventional processes necessitate a significant energy input in to the system. It would be beneficial to reduce the energy consumption of the absorption AGR processes compared with conventional processes.

BRIEF SUMMARY OF THE DISCLOSURE

An object of aspects of the present invention is to provide an absorption gas removal process which overcomes and/or mitigates one or more of the problems indicated above and/or other problems. According to an aspect of the invention, there is provided an gas removal method for removing components from a source fluid using an absorbent, the method including exchanging heat in a heat exchange system between streams generated in the method, the method including the steps of:

passing the source fluid through the absorbent in an absorber column such that acid component from the source fluid is absorbed by the absorbent to form an acid-depleted fluid and an acid-rich absorbent, drawing a draw/return stream from the absorber column to the heat exchange system, cooling the draw/return stream in the heat exchange system and returning the draw/return stream to the absorber column, passing the acid-rich absorbent to the heat exchange system and a first regeneration unit comprising separation apparatus and separating acid component from the acid-rich absorbent to form regenerated absorbent and an acid-rich vapour, compressing at least a part of the acid-rich vapour generated in the separation apparatus to form compressed acid-rich vapour and passing the compressed acid-rich vapour to the heat exchange system, wherein the heat exchange system effects the exchange of heat from and/or to at least a part of each of the following streams
   (i) the acid-rich absorbent
   (ii) the compressed acid-rich vapour
   (iii) the regenerated absorbent
   (iv) the draw/return stream taken from the absorber column.

Thus in examples of the present invention, the absorption and regeneration steps are combined using heat integration to balance hot flow associated with the absorbent and relatively cool flow associated with the regeneration. In conventional systems, a water/air heat exchanger is used to cool the absorbent, and steam is used to heat the stream for regeneration. In examples of the invention, the hot flow and cold flow sections of the system are integrated.

The acid component may, in examples of the invention, comprise an acid gas component comprising one or more of $CO_2$ and $H_2S$. The source gas may comprise an acid gas, for example natural gas including $CO_2$ and/or $H_2S$. Thus the acid-rich vapour and acid-rich absorbent may be rich in $CO_2$ and/or in $H_2S$.

In some examples, the acid gas component will be present as a gas in the source fluid. In other examples, at least a part of the acid gas component may be present for example as a liquid.

The separation apparatus may comprise for example a separator drum.

In this aspect of the invention, the acid-rich vapour is compressed. It has been identified that the application of compression is desirable for advantageous performance of the heat exchange. By compressing the separated acid-rich vapour, it is possible in some examples to return to the heat exchange system, and in this way achieve a higher temperature on the absorbent side.

According to the invention, a draw/return stream is extracted from the absorber column for cooling in a heat exchanger. In examples of the invention, more than one draw/return stream may be present. The draw/return streams may extract a stream from any part of the column, where there is more than one stream, they may extract and return from the same or different regions of the column. In many examples, the stream will be returned to a location close to the extraction location; alternatively, the return location may be remote from the draw location.

The heat exchange system may be one multi-pass heat exchanger or a different combination of more than one heat exchanger, for example a combination of plural heat exchangers.

In some examples, the process is substantially autothermal. Preferably, in such examples, substantially no heat is input into the system and substantially no external cooling is provided.

In some arrangements, it will be convenient to arrange for some external cooling to be provided, for example using water, or in some cases air. Preferably there is substantially no external heat provided to the processes. In some cases compression of one or more streams may provide heat into the system.

The acid absorption steps and absorbent regeneration steps may be heat balanced without external refrigeration or external heat input.

In many examples, the regenerated absorbent recovered from the first regeneration unit will contain some acid, in that not all of the acid will have been removed from the absorbent in the separation step. Therefore, in some examples, the method will further comprise a second regeneration unit, downstream of the first, in which further acid component can be removed from at least a portion of the recovered semi-rich absorbent from the first regeneration unit.

Preferably the method includes passing semi-rich absorbent from the first regeneration unit to a second regeneration unit in series with the first regeneration unit for removal of acid component from the semi-rich absorbent.

The second regeneration unit may for example include a heat exchanger and separation apparatus, for example separator drum and/or stripper column.

The regenerated absorbent from the first regeneration unit may be semi-rich, and the method may further comprise the steps of:

passing the semi-rich absorbent to a heat exchanger and a stripping column and removing acid component from the semi-rich absorbent in the stripping column, recovering absorbent from the stripping column and
 (i) partially reboiling the recovered absorbent through a heat exchanger to form a reboiled absorbent and reboiled acid-rich vapour,
 (ii) separating acid-rich vapour from the reboiled absorbent and passing resulting separated reboiled acid-rich vapour back to a stripping column and cooling the resulting regenerated reboiled absorbent, recovering acid-rich vapour from the stripping column and
 (i) compressing the recovered acid-rich vapour from the top of stripping column to form compressed acid-rich vapour, and
 (ii) cooling the compressed acid rich vapour. wherein the method includes exchanging heat between least a part of each of the following streams
 (a) the semi-rich absorbent
 (b) the compressed acid-rich vapour
 (c) the regenerated reboiled absorbent
 (d) the absorbent recovered from the base of the stripping column.

By compressing the stream, a temperature differential can be applied to the stream which is then passed to the heat exchanger which aids in the reboiling.

In some examples, the acid gas comprises carbon dioxide and hydrogen sulphide.

Carbon dioxide-rich/hydrogen sulphide lean absorbent may be extracted from the acid-rich absorbent recovered from the absorber column and is passed to a wash column downstream of the absorber column to recover hydrogen sulphide lean carbon dioxide.

Preferably semi-lean, for example $CO_2$ rich and $H_2S$ lean, absorbent extracted from the absorber column is used to wash acid gas, for example $H_2S$ and $CO_2$ through flush and through regeneration to deliver $H_2S$ lean $CO_2$.

$H_2S$ lean absorbent may be extracted from a region near the middle of the absorber column. A liquid draw/return line may be located above that region so that the bottom part of the absorption column, for example from the extraction line to the bottom, operates as an $H_2S$ absorption section.

An atmospheric pressure wash column may be provided. Flushed $H_2S$ lean extracted absorbent may be applied at the top as a washing media. Flushed acid gas rich absorbent (from the absorption column bottom) may be supplied at or near the bottom to release acid gas to be washed.

Acid gas rich absorbent from the wash column bottom preferably is subject to regeneration where separated acid gas is returned to the wash column bottom for an $H_2S$ wash. Acid gas through the flush and regeneration both rise together from the wash column bottom where $H_2S$ is to be washed out and $H_2S$ lean $CO_2$ is delivered at or near the top.

The method may further include the step of supplying carbon dioxide to the second regeneration unit.

The method may further include the step of supplying carbon dioxide to the stripper column.

Preferably the apparatus includes a stripper column and the carbon dioxide is supplied to the stripper column. In this way, reboil stripping can be reinforced.

Preferably the carbon dioxide is substantially free of hydrogen sulphide.

Preferably semi-rich absorbent is supplied to the stripper column after heat-up through a heat exchanger and separation in a separation drum. The vapor of the separation column is preferably compressed then returned to a heat exchanger for sensible & latent (absorbent condensation) heat recovery and absorbent condensation mass recovery, for example through a separation drum after the heat exchanger. The vapor of the separator drum ($H_2S$ rich acid gas) may be delivered to disposal.

$H_2S$ free $CO_2$ may be supplied to the stripper column at a lower location such that an upper part of the column is effective as a $CO_2$ stripping section while the bottom part of the column is effective as a reboiler stripping section.

Vapor of the stripped absorbent stripped through stripper column (including acid gas, stripping $CO_2$ and absorbent vapor) may be compressed then returned to the heat exchanger for sensible and latent (absorbent condensation) heat recovery and absorbent condensation mass recovery for example through a knock-out drum after the heat exchanger.

Preferably the liquid part of the stripped absorbent passes through the heat exchanger twice: first for partial reboiling and second for absorbent sensible heat recovery.

The method may further comprise a cryogenic condensation step upstream, for example upstream of the absorbing step.

The method may further include the step of cooling and/or compressing a stream such that a two-phase stream is formed.

Thus the method may include cooling the source fluid such that a component of the fluid condenses and a two-phase stream is formed. For example carbon dioxide may be condensed and later separated. The method may include the step of, prior to the passing of acid gas through the wash column absorbent, pre-saturating the absorbent with carbon dioxide.

Preferably the method includes pre-saturating the absorbent before passing the feed gas into the wash column. For example for a physical absorption washing column, the wash MeOH may be pre-saturated for example with substantially pure $CO_2$ liquid. This may be provided for example by a side stream of $H_2S$-free output $CO_2$ which is compressed and cooled/liquefied. The $CO_2$ may then be supplied for example to the top of the wash column to be mixed with the wash MeOH.

By adding carbon dioxide to the absorbent, it can be arranged that little or no carbon dioxide is absorbed by the absorbent. For example, where the acid gas comprises carbon dioxide and hydrogen sulphide, by washing the absorbent with carbon dioxide, in some examples effectively only hydrogen sulphide is absorbed in the absorbent column. This can give the additional advantage in some arrangements that the absorption step can occur at substantially constant temperature by reducing the absorption exotherm by avoiding carbon dioxide absorption in the column.

The pre-saturation carbon dioxide is preferably from a liquefied pure carbon dioxide output stream. The method may include compressing, cooling and/or liquefying acid rich vapour to form a recycle acid stream, and passing the recycle acid stream into the source fluid upstream of the absorbent.

By injecting the recycle acid gas stream prior to the absorption column, the temperature of the gas through acid gas evaporation can be decreased, in some examples enhancing efficient low temperature absorption.

In some cases, the acid rich stream is liquefied to form a liquid recycle acid stream and the liquid recycle acid stream is injected into a process stream.

The injected liquid recycle acid stream can provide significant cooling. In some examples, the stream may be injected into a feed gas stream. The absorbent may comprise a chemical solvent. The chemical solvent may for example comprise an amine, for example Monoethanolamine (MEA) or Methyldiethanolamine (MDEA) (a tertiary amine). Other chemical solvents are possible, for example ammonia, or carbonates for example potassium or ammonium carbonate.

The absorbent may comprise a physical solvent, for example methanol. The solvent may include for example one or more dimethyl ethers of polyethylene glycol and/or N-methyl-2-pyrrolidone (NMP).

The absorbent may comprise a mixture of solvents and/or other components. For example the solvent may include additives. As an example, MDEA may include additives to improve the effective removal of $CO_2$, or inhibit corrosion. An additive package may be included in the absorbent composition, and may for example be chosen in dependence on the specific application and composition of the feed gas which is to be treated. For example it has been proposed to use an activated MDEA solution of 45% wt MDEA solution with 5% wt piperazine (diethylenediamine) as a $CO_2$ absorption promoter to remove 0.5% $H_2S$ and 3% $CO_2$. Further activated MDEA solutions with up to 7% wt piperazine added to between 30% and 50% MDEA have been studied and reported. In some examples of the invention, carbon dioxide is removed.

In some examples there may be co-capture of carbon dioxide and hydrogen sulphide and/or other acid gas components. In other examples only substantially one acid gas component might be captured.

Where reference is made herein to the use of heat exchangers, any appropriate heat exchange apparatus may be used. Preferably multichannel heat exchangers are used. In examples, the heat exchangers may comprise aluminium or aluminium alloy. In other examples, for example where the operating pressure in relation to the heat exchanger is 100 bar or more, welded or diffusion bonded stainless steel heat exchangers might be preferred.

Where reference is made to a heat exchanger, it might include for example, one or more heat exchanger elements. For example, the heat exchanger may include one or more multichannel heat exchange units.

In examples of aspects of the invention described herein, a draw and return path is used to pass absorbent of the absorber column for heat exchange, which has the effect of cooling the absorbent. In other examples, it is envisaged that the cooling can be effected cooling applied to the absorber column or other apparatus. Cooling may be applied externally to the absorber column, for example using an external heat exchanger. For example, a heat exchange jacket could be provided.

Therefore, according to another aspect of the invention, there is provided an acid gas removal method for removing acid components from a source fluid using an absorbent, the method including exchanging heat in a heat exchange system between streams generated in the method, the method including the steps of:

passing the source fluid through the absorbent in an absorber column such that acid component from the source fluid is absorbed by the absorbent to form an acid-depleted fluid and an acid-rich absorbent, cooling the absorbent in the absorber column, passing the acid-rich absorbent to a regeneration unit and removing acid component from the acid-rich absorbent to form regenerated absorbent and an acid-rich vapour, compressing at least a part of the acid-rich vapour generated in the regeneration unit to form compressed acid-rich vapour and passing the compressed acid-rich vapour to the heat exchange system, wherein the heat exchange system effects the exchange of heat from and/or to at least a part of each of the following streams (i) the acid-rich absorbent (ii) the compressed acid-rich vapour (iii) the regenerated absorbent.

In some cases of this aspect, the cooling of the absorbent in the absorber column could include providing an external coolant or refrigerant to the absorber column.

The external coolant may comprise, for example, water or ammonia.

The coolant may be provided at an external surface of the absorber column to cool the column or may for example be provided within the column, for example as a heat exchanger in the absorber column.

A further aspect of the invention provides an acid gas removal system for removing acid components from a source fluid using an absorbent, the apparatus comprising:

an absorber column comprising an absorbent for absorbing acid component from the source fluid to form an acid-depleted fluid and an acid-rich absorbent, a heat exchange system a draw/return path from the absorber column to the heat exchange system, for passing absorbent from the absorber column to the heat exchanger, and returning the draw/return stream from the heat exchanger to the absorber column, a path for passing the acid-rich absorbent to the heat exchange system;

a first regeneration unit comprising separation apparatus for separating acid component from the acid-rich absorbent to form regenerated absorbent and an acid-rich vapour, a compressor arranged for compressing at least a part of the acid-rich vapour generated in the separation apparatus to form compressed acid-rich vapour and passing the compressed acid-rich vapour to the heat exchange system, wherein the heat exchange system is arranged to effect the exchange of heat from and/or to at least a part of each of the following streams
- (i) the acid-rich absorbent
- (ii) the compressed acid-rich vapour
- (iii) the regenerated absorbent
- (iv) the draw/return stream taken from the absorber column.

The source gas may in examples of the invention be any acid gas containing for example carbon dioxide and/or hydrogen sulphide. For example, the source gas may include natural gas and/or process gas, being a gas generated in or derived from an output of a process.

The invention extends to methods and/or apparatus substantially as herein described with reference to the accompanying drawings.

Any feature in one aspect of the invention may be applied to other aspects of the invention, in any appropriate combination. In particular, features of method aspects may be applied to apparatus aspects, and vice versa.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 1 shows schematically a conventional absorption acid gas removal process;

FIG. 2 shows schematically an example of an autothermal acid gas removal process;

FIG. 3 shows schematically a further example of an autothermal acid gas removal process in which a stripper column is used for additional acid gas removal;

FIG. 4 shows schematically an example of the invention in which autothermal acid gas removal is used to remove carbon dioxide and $H_2S$ from acid gas stream;

FIG. 5 shows schematically an example of the invention in which autothermal acid gas removal is used to remove carbon dioxide from a gas stream using MeOH as absorbent;

FIG. 7 shows schematically an example of the invention in which autothermal acid gas removal is used to remove hydrogen sulphide from a gas stream using MeOH as absorbent.

DETAILED DESCRIPTION OF THE PREFERRED EMBODIMENTS

Figure 1A:
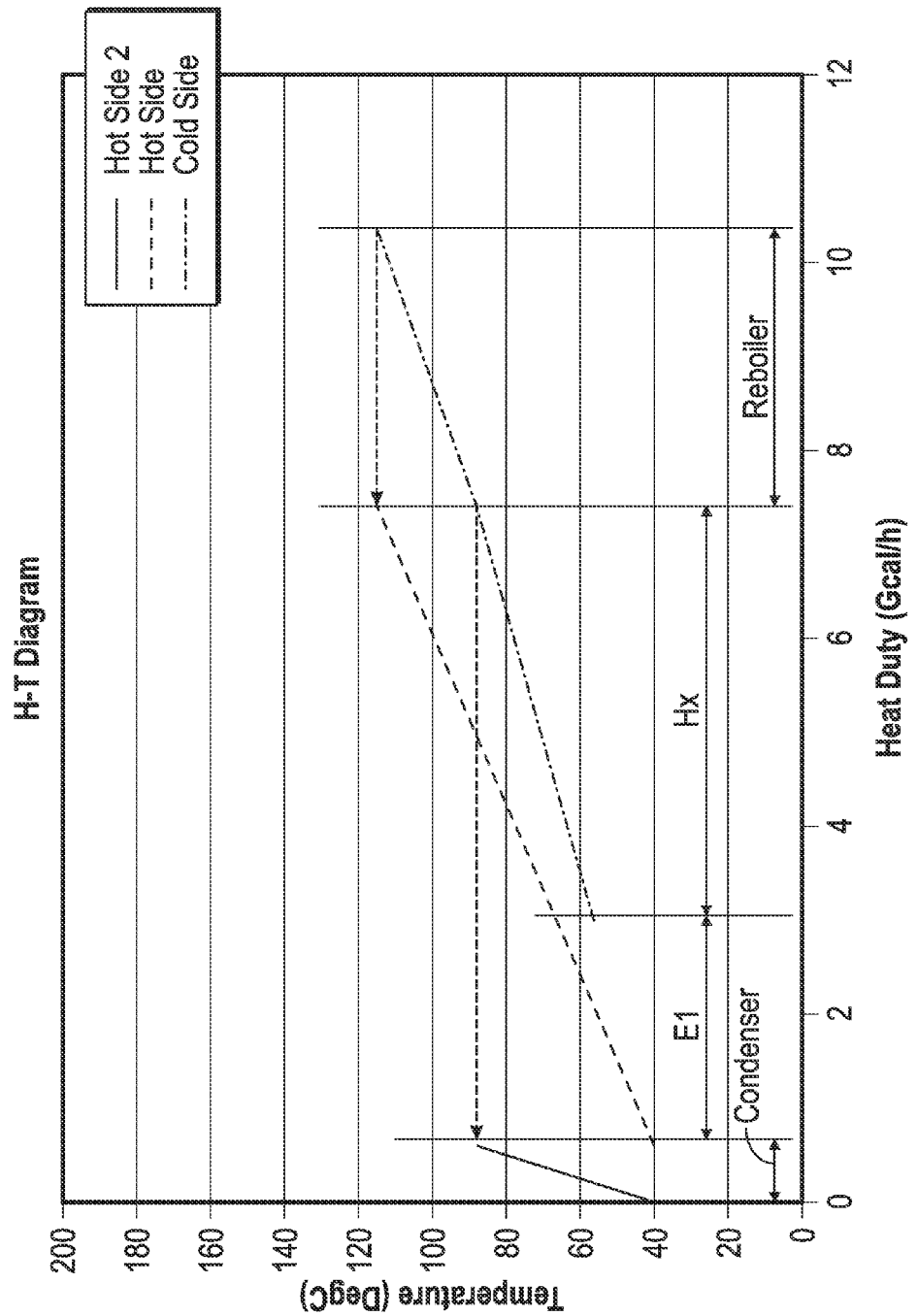
FIG. 1a shows a graph of a heat duty/temperature profile of a process of the type of FIG. 1.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections.

The following examples describe embodiments of one or more features of the invention as applied to chemical solvent based systems and to physical solvent based systems. In the examples below, a chemical solvent based system including a tertiary amine, methyldiethanolamine (MDEA) system is described. A physical solvent based system including methanol (MeOH) is described. Where appropriate, it will be understood that features described in relation to one system can be applied equally in relation to another system in further examples. Also, features which are described in relation to one example may be applied to other examples, as appropriate.

Some of the examples relate to the capture of both carbon dioxide and hydrogen sulphide from the source fluid, which is referred to herein as co-capture. Other examples relate to processes in which one single dominant acid gas component is removed, for example carbon dioxide only or hydrogen sulphide only. It will be understood that in those other examples, other components might also be captured in addition to the co-capture components or the dominant component.

In examples described for co-capture and separation of the acid gas into its constituents, such as $H_2S$ and $CO_2$, a wash column and stripper column are included. For simple removal of acid gas components as a whole from the feed gas, for example carbon dioxide and hydrogen sulphide, a simpler system is described without the wash column and stripper.

Conventional System

FIG. 1 shows a conventional absorption acid gas removal process. In the process of FIG. 1, there is both cooling (−Qout) as exothermic absorption heat is removed, and also heating (+Qin) as endothermic regeneration heat is supplied.

FIG. 1 shows an absorber column A1 and a regeneration column A2. The solvent used in this example is MDEA and the source gas ACID_GAS includes carbon dioxide. An acid gas-rich MDEA stream 01 leaves the base of the absorber column A1 and passes to a heat exchanger E8 which exchanges heat between the cooler acid rich MDEA stream 02 and a warmer recovered lean MDEA stream 04 from the regeneration column A2 as described further below.

The resulting warmed acid gas-rich MDEA stream 03 passes to the regeneration column A2 where acid gas-rich vapour is generated in a conventional known way in the column reboiler and passed through a column condenser for cooling and MDEA recovery, generating a recovered carbon dioxide gas stream. A lean MDEA stream 04 is recovered from the base of the reboiler, and passes through the heat exchanger E8, exchanging heat with the acid-rich MDEA stream 02. Prior to being recycled back to the absorber column A1, the warmed MDEA stream 06 then is passed to a precooler E9 which removes heat from the lean MDEA.

An example of a process such as shown in FIG. 1, has a heat duty/temperature profile as shown in the graph of FIG. 1a, the cooling Qin (as Reboiler heat duty) being 3.0 Gcal/h, heating Qout (as Condenser & precooler heat duty) being 3.0 Gcal/h.

Autothermal Arrangement

FIG. 2 shows schematically an absorption acid gas removal process according to an example of the present invention in which the absorption and regeneration heats are balanced through a common heat exchanger E1;

The arrangement shown in FIG. 2 includes an absorber column A1, a simple separation drum F1 which is used for regeneration of the absorbent and a compressor C1 arranged for the compression of the acid gas stream 31 from the separation drum F1. The solvent used in this example is MDEA and the source gas ACID_GAS is natural gas including carbon dioxide. The acid natural gas stream is fed to the MDEA in the absorber column A1 where acid gas, including carbon dioxide is absorbed by the MDEA and an acid-gas lean clean natural gas stream CLEAN_GAS is output from the absorber column A1.

An acid gas-rich MDEA stream 11 leaves the base of the absorber column A1 and passes to a heat exchanger E1 which exchanges heat between the warm MDEA streams 21,23,32, 41 and is passed to the separation drum F1 where acid gas is recovered as stream 31. Acid gas stream 31 is passed to compressor C1 and a lean MDEA stream 41 is passed from the separator drum F1 to the heat exchanger E1. The cooled lean MDEA stream 42 is pumped (using pump P1) and recycled back to the absorber A1.

The compressed acid gas stream 32 is then passed back through the heat exchanger E1 before the resulting cooled compressed acid gas stream 33 is passed to a further separator drum F2 where further MDEA is recovered as stream 34 and combined with the rich MDEA stream 12 upstream of the heat exchanger E1 while recovered acid gas stream, containing mainly of carbon dioxide is obtained as $CO_2$ gas stream.

Two draw and return streams 21, 22 and 23, 24 take acid-gas containing MDEA from a bottom section of the absorber column A1 and pass it to the heat exchanger E1.

By including draw and return streams close to the base of the absorber E1, the temperature of the acid-rich solvent at the base of the absorber can be reduced. In this example, both of the pairs of draw/return streams 21, 22 and 23, 24 are set close to the base of the absorber column. Other arrangements are possible.

The heat exchanger E1 illustrated in FIG. 2 is a multichannel heat exchanger, in which a high thermal conductivity body (for example comprising aluminium or aluminium alloy) includes several channels thermally connected for transferring heat energy between fluid streams flowing in separate channels in the body. This is a type of heat exchanger often used for cryogenic service.

In FIG. 2, the heat exchanger E1 is shown as a single element. In some examples, it may comprise two or more units thermally connected together.

The absorption and regeneration heats are balanced through the common heat exchanger E1 with the absorption column output 12 being a cooler fluid and all the rest of the streams being hotter fluid.

The absorption step is carried out at a relatively high pressure such as 30-70 Bar and a valve V1 is provided for letting down the pressure by flashing to below the theoretical isothermal pressure prior to heat exchange. This lower flash pressure (in this example 0.6 Bar) enables reduced temperature feed for heat exchange thus low temperature return streams to absorption column A1 and also enables relatively lower temperature requirement for regeneration (in this example 80 Deg C.). In some cases, valve V1 could be replaced for example by a hydro turbine, in which example, could be used to provide power for the pump P1.

The acid gas recovered from the regenerated rich absorbent after heat exchange and separation is compressed before return to the heat exchanger. This compression raises the vapour re-condensation temperature because the pressure is proportional to the condensation temperature. At the same time, the compression step provides a temperature increase in the vapour stream which is then passed back to the heat exchanger raising the temperature of the heat exchanger E1. Thus the temperature of the heat exchanger can be controlled by controlling the amount of compression applied to the acid gas stream 31 by compressor C1.

In the example shown in FIG. 2, only one compressor is shown, but it will be understood that in some examples, more than one compressor unit may be present to effect compression in multiple stages. Cooling between compression steps could be provided, for example at least partly in relation to the heat exchanger E1. Any appropriate type of compressor may be used such as centrifugal type or displacement type. The compression ratio of the compressor C1 (or the overall ratio where multi compression is used) may for example be about 2:1. In the present example, vapour stream 31 at 0.6 Bar is compressed using compressor C1 to a pressure of 1.2 Bar.

The process as shown in FIG. 2 is autothermal in that there is no external heat input (Q) or heat output although work W is input (in this example 367 kW) into the system by the compressor C1. In some arrangements, some external heating and/or cooling may be provided to assist autothermal heating/cooling of the MDEA if these are readily available.

The balancing of the heat occurs within the heat exchanger E1. In the absorber ABS, the heat generated by the absorption of the gas into the MDEA is transferred to the heat exchanger E1 by the two draw and return stream pairs 21, 22 and 23, 24 which take liquid from the absorber column A1 to the heat exchanger E1. This recovered heat is used in the regeneration of the rich MDEA.

Figure 2A:
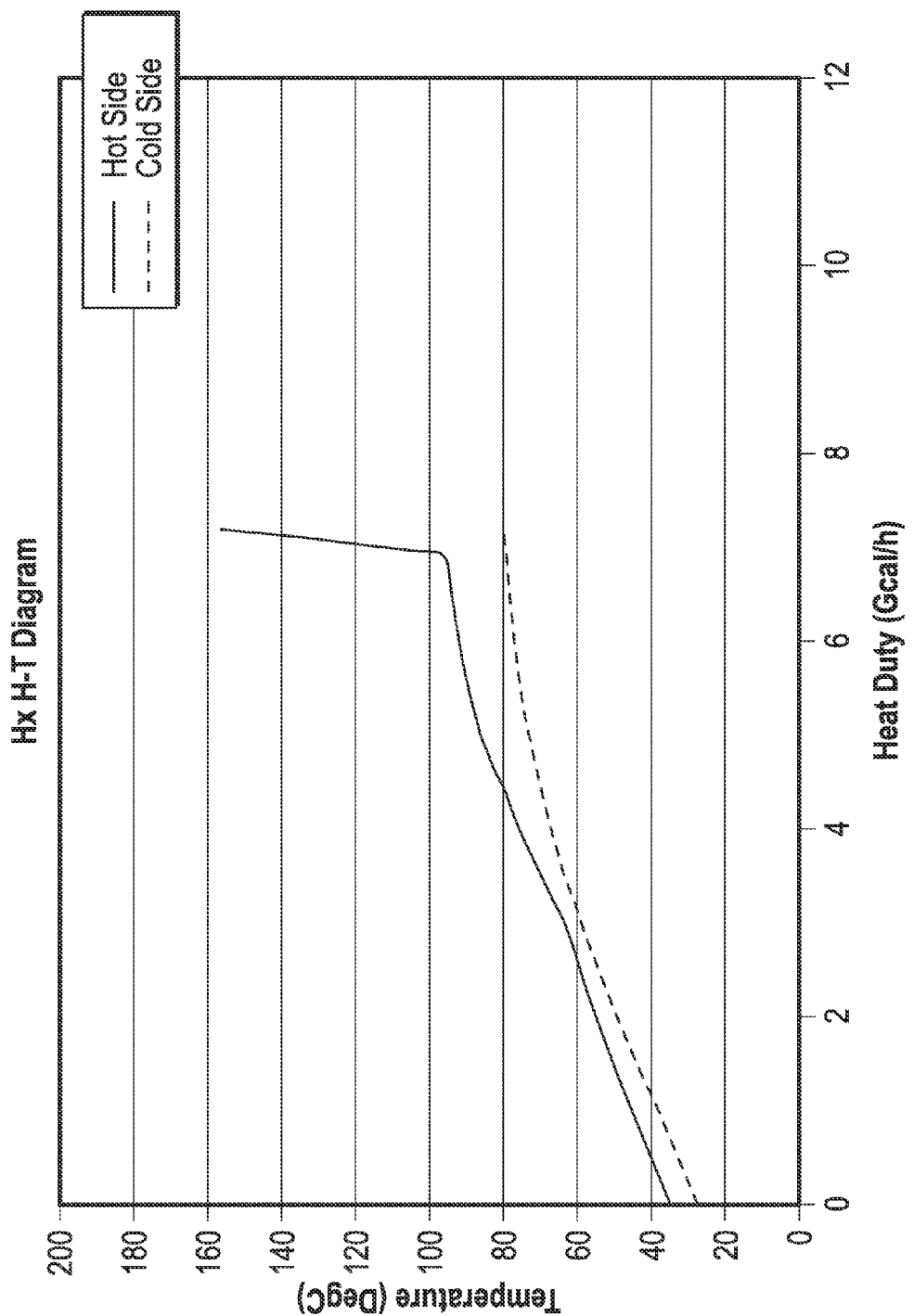
FIG. 2a shows a graph of a heat duty temperature profile of a heat exchanger of the example of FIG. 2.

FIG. 2a shows the heat exchanger H-T diagram in which it can be seen that the cold side temperature (rich absorbent temperature) and the hot side temperature are substantially parallel indicating that the target heat exchange is enabled.

The acid natural gas ACID_GAS is fed to the system at a pressure of 46 Bar and a temperature of 40deg C. In other arrangements, the temperature may be for example within the range of about 30 to 60 deg C. and the pressure may be for example up to 70 bar, for example from about 30 to 70 bar in some cases, although other temperatures and pressures could be used in other examples. Preferably the pressure of the feed stream is as fed, with no compression upstream of the absorber column A1. Carbon dioxide from the natural gas feed is absorbed into the MDEA in the absorber column A1 and carbon dioxide lean natural gas is returned at clean gas stream CLEAN_GAS. Lean MDEA 43 is supplied to the top of the absorber column and is returned from the absorption/regeneration system as explained further below. Two liquid extraction stream pairs, draw and returns 21, 22 and 23, 24 are routed from the absorber column to the heat exchanger E1.

The acid rich MDEA recovered from the absorber A1 at 11 is flash cooled across valve V1 prior to being passed to the heat exchanger E1. The pressure is lowered to vacuum pressure, here 0.6 Bar for the required heat balance. In some arrangements, the flash cooled stream may be fed to a separator drum, the recovered liquid stream being passed to the heat exchanger. Downstream of the heat exchanger E1, the separated carbon dioxide is removed in a separator drum F1, while the lean regenerated MDEA (for example having an acid gas loading of 0.1%) is returned to the absorber A1 via the heat exchanger and a pump.

There are advantages with this arrangement in comparison with a conventional MDEA absorbent system. Firstly, the system is compact. The MDEA flow is two thirds to a half of that of the conventional system, and the absorber cross section need only be two thirds to a half of that of the conventional system. There may be no need for a stripper column in such arrangements. By providing the absorber column cooling, a higher loading, for example 1.5 to 2 times higher loading of the MDEA can be achieved. For example, the MDEA loading may be 0.75 compared with a conventional range of about 0.4 to 0.5. Secondly, there is no requirement in the present example for steam heating or for external refrigeration. Thirdly, less power is required.

| Power Requirement for Regeneration | Conventional as FIG. 1 | System of FIG. 2 |
|---|---|---|
| Steam Heating | 3.0 Gcal/h (equivalent to 520 kW using a heat-to-power conversion factor of 0.15) | 0 Gcal/h |
| Cooling | 3.0 Gcal/h (equivalent to 170 kW using a heat-to-power conversion factor of 0.5) | 0 Gcal/h |
| Power | 0 kW | 367 kW (for compressors) |
| Total | 690 kW | 367 kW |

FIG. 3 shows schematically another example of an acid gas removal system in which a greater ppm acid gas removal can be obtained in some cases.

The stripping process includes partial absorbent vaporization (reboiling) and subsequent condensation in a stripper column. In this example, heat from the reboiling step and the condensation step are at least partly balanced within the system.

The system is similar to that shown in FIG. 2 except for the addition of the reboiling and condensation sub-system SS01. This sub-system SS01 includes a stripper column A2, multi-channel heat exchanger E2 and compressor C2. The arrangement of the heat exchanger E2, stripper A2 and compressor C2 are similar to those of the heat exchanger E1, separation drum F1 and compressor C1 of FIG. 2. In the arrangement of FIG. 3, the separated regenerated absorbent stream 51 recovered from the separation drum F1 is, instead of being fed directly back to the heat exchanger E1 as in the system of FIG. 2, fed to the sub-system SS01. Regenerated absorbent stream 51 is fed first to the sub-system heat exchanger E2 where it is heated for partial reboiling of the absorbent before being fed to the top of the stripper column A2. The stripper column A2 itself operates in a conventional way in a similar way to that of column A2 in FIG. 1.

The resulting separated absorbent stream 81 and acid vapour stream 71 (including acid gas and absorbent vapour) recovered from the stripper column A2 are fed to the heat exchanger E2. In the example shown in FIG. 3, the separated vapour stream 71 is first increased in pressure by passing it to compressor C2 before being returned to the heat exchanger E2 for sensible and latent heat recovery (with absorbent condensation) and absorbent condensation mass recovery through a further separator drum F3, knock out drum as described further below. The higher pressure stream 72 leaving the compressor C2 and being fed to the heat exchanger E2 is also increased in temperature, the increased temperature being supplied to the heat exchanger and gives a greater temperature differential which is then used for the heating of the regenerated absorbent stream 51 fed from the first separator drum F1.

The cooled high pressure acid gas stream 73 leaving the heat exchanger E2 is then fed to a third drum separator F3 and the recovered absorbent stream 74 is fed back to the stripper column A2, the recovered acid gas stream 75 being cooled in the first heat exchanger E1 together with recovered acid gas stream 32 as described in relation to the example of FIG. 2. Meanwhile, the recovered absorbent stream 81 from the stripper column A2 is further heated through the heat exchanger E2 and the heated stream 82 is passed to a fourth drum separator F4, separated acid gas stream 83 is returned to the stripper column A2, and the separated absorbent stream 84 is passed through the heat exchanger E2 for cooling before the resulting cooled stream 41 is passed back to the first heat exchanger E1 for further cooling and return to the absorber column A1. Thus it will be seen that the liquid part of the stripped absorbent stream from the stripper column A2 passes through the heat exchanger E2 twice: firstly for partial reboiling with boiled vapour returned to the stripper column A2 through the knock out drum or separator drum F4 and secondly for absorbent heat recovery from stream 84 before passing to the other heat exchanger E1.

In this example, the additional autothermal stripping is added in which the heat required for the partial reboiling of the absorbent and the cooling of the absorbent and the separated acid gas is balanced without the use of external refrigeration and/or external heating being required. The cooling and heating is provided internally using heat exchange within a heat exchanger between the liquid after regeneration, compressed vapour after the stripping column, partial reboiling of liquid after the stripping column and liquid after reboiling.

Additional heat is added to the heat exchanger as a result of the compression of the vapour stream recovered from the stripping column.

Thus the lean absorbent from the base of the stripper column A2 is partially boiled in E2 back to the column before being returned to E1. The compression provided by C2 raises the vapour re-condensation temperature and provides the temperature differential required for the heat exchanger E2.

It has been found in examples that the power requirement for the autothermal stripping sub-system SS01 such as for the example illustrated in FIG. 3 is significantly reduced compared with an equivalent system reliant on the provision of external cooling and heating.

| Additional Power Requirement for Stripping | Conventional as FIG. 1 (Additional Power on to Regeneration Power) | Sub-System SS01 of FIG. 3 |
| --- | --- | --- |
| Steam Heating | 3.0 Gcal/h (equivalent to 520 kW using a heat-to-power conversion factor of 0.15) | 0 Gcal/h |
| Cooling | 3.0 Gcal/h (equivalent to 170 kW using a heat-to-power conversion factor of 0.5) | 0 Gcal/h |
| Power | 0 kW | 258 kW (for compressors) |
| Total | 690 kW | 258 kW |

For a greater ppm acid gas removal, additional power is required to the basic power requirement of the conventional system as in FIG. 1, which for this example is assessed to be an additional 3 Gcal/h to each of heating and cooling in the conventional system. As the sum of the above table and the table for FIG. 2, the total power input for a conventional system for greater ppm acid gas removal is calculated as being 1380 kW compared with 625 kW required for the autothermal system based on FIG. 3. Thus the power requirement for the example system of the invention is less than half of that required for the conventional system.

FIG. 4 shows schematically an example of the invention in which autothermal acid gas removal is used to remove $CO_2$ and $H_2S$ from a natural gas stream;

The system is similar to that of FIG. 3 except that a washing column is added and the lower half of the absorption column is designated for $H_2S$ absorption. The washing column A3 is fed by a stream from the absorber column A1 which is taken from the middle of the absorber column A1, shown as stream 25. The stream 25 is a $H_2S$ lean MDEA stream which is extracted for use as a washing liquid for separated acid gas ($CO_2$ and $H_2S$) both through flush and through autothermal regeneration and delivers $H_2S$ lean $CO_2$. Reboiling and condensation sub-system SS01 in FIG. 3 is modified here as sub-system SS02 to facilitate $H_2S$ stripping with pure $CO_2$ admission to the column for more efficient stripping.

In the arrangement shown in FIG. 4, the top section (approximately half in this example) of the absorber column A1 acts as a $CO_2$ absorber in the same way as the absorber column A1 in FIG. 3 and the bottom section acts as an $H_2S$ absorber. Since the MDEA from the top half of the absorber column A1 is already $CO_2$ rich and because of the strong selectivity of MDEA to $H_2S$, substantially only $H_2S$ is absorbed in this bottom half of the column and substantially no $CO_2$ is absorbed.

It will be seen that, similar to the arrangement of FIG. 3, the autothermal absorption/regeneration system includes a heat exchanger, here designated as E1. The heat exchanger E1 is arranged to exchanger heat between two draw/return pairs of streams 21, 22 and 23, 24 taking from and returning to a region in the middle of the absorber column A1 as same as streams 21, 22 and 23, 24 in FIG. 3.

The $CO_2$ and $H_2S$ rich stream 11 from the absorber column is passed through the wash column A3, the heat exchanger E1, and a separator drum F1 where most of the $CO_2$ is separated from MDEA while a fair amount of $H_2S$ remains in MDEA due to strong $H_2S$ MDEA bonding. Separated $CO_2$ and $H_2S$ gas steam 31 passes through compressor C1, heat exchanger E1, and separation drum F2 in the same way as FIG. 3. Cooled $CO_2$ and $H_2S$ gas stream 35 is supplied to wash column A3 which produces $H_2S$ free $CO_2$ stream 36.

$H_2S$ concentrated stream 51 with Claus compatible $H_2S/CO_2$ ratio is passed to the auto thermal stripper unit, to heat exchanger E2 where it is warmed prior to separation in separation drum F5. The absorbent stream 53 recovered from the separation drum F5 is then passed to a stripper column A2. Thus it will be seen that much of the absorbed carbon dioxide and hydrogen sulphide in the acid rich MDEA stream is separated as Claus compatible $H_2S/CO_2$ mixture before the MDEA stream 53 is passed to the stripper column. Separation drum F5, compressor C3 and separation drum F6 are added to sub-system SS01 in FIG. 3 because a stripper column with $CO_2$ admission as explained later will not normally produce a Claus compatible $H_2S/CO_2$ mixture. The acid vapour stream 61 recovered from the separator drum F5 is compressed using compressor C3, before passing the compressed stream 62 to the heat exchanger E2. The compression of stream 61 to 62 provides further heat input into the heat exchanger in a manner similar to that described above in relation to FIG. 3. The cooled stream 63 is then passed to a further separation drum F6 in which a -condensed MDEA stream 64 is formed and sent to the top of the stripper column A2.

In the top part of the stripper column A2, $H_2S$ stripping occurs using substantially pure $CO_2$ admitted to the column. A $CO_2$ rich stream generated from the washing column A3 is passed as stream 37 to the lower part of the stripper column A3. In some examples the stream 37 may comprise substantially pure $CO_2$. It has been identified that $H_2S$ stripping with substantially pure $CO_2$ input into the stripper column A2 can give more efficient $H_2S$ stripping than heating. Separated $CO_2$ rich vapor stream 71 at the top of the column and its downstream arrangements are the same as sub-system SS01 in FIG. 3. In the bottom part of the stripper column A2, $CO_2$ stripping occurs with same downstream arrangements as sub-system SS01 in FIG. 3.

In comparison with conventional MDEA systems which can only perform $H_2S$ and $CO_2$ co-capture with single $H_2S$ and $CO_2$ mixture output, the system of FIG. 4 can provide for $H_2S$ and $CO_2$ co-capture with a Claus compatible $H_2S/CO_2$ mixture and pure $CO_2$ output using a single MDEA system. The system is compact, using only about two thirds to a half of the absorbent flow and absorber column sectional size of a conventional MDEA system. The system can be self-contained in that no steam input or external refrigeration is required. It can also require less power than for a conventional MDEA system.

FIG. 5 shows schematically an example of the invention in which autothermal acid gas removal is used to remove carbon dioxide from a gas stream using a physical absorbent.

In this example, the physical absorbent MeOH is used for absorbing $CO_2$ in the absorber column A1. In this example, the gas stream acid gas comprises syngas at a pressure of about 75 Bar from which hydrogen sulphide has already been removed.

The system is similar to that shown in FIG. 2 except for the addition of an autothermal condensation acid gas removal process to the absorption/regeneration process in which there is no external heating or cooling duty input into the system. The heat of absorption of the $CO_2$ into the MeOH, the regeneration heat and the balancing of the $CO_2$ condensation heat and evaporation heat are managed to give an autothermal system. For the physical absorption in MeOH, acid gas condensation separation is also used and integrated into the absorption separation. Phase change separation is more efficient and simple in some examples compared with absorption separation. Since the condensation conditions (including higher pressure and lower temperature) are also those required for efficient absorption conditions, the combination can give rise to good AGR performance. In this example, a heat exchanger system includes two heat exchangers including E3 which balances the absorption heat and regeneration heat, and heat exchanger E1 which balances condensation heat and regeneration heat.

Acid gas stream 101 comprising syngas at a pressure of 75 Bar and a temperature of −50 deg C. is fed to the bottom of the absorber column A1. $CO_2$ is absorbed in the column and a $CO_2$ lean syngas stream 102 is returned from the top of the absorber column A1. Lean MeOH is supplied to the top of the column and two pairs of draw/return streams 121, 122 and 123, 124 are extracted from and returned to the absorber column A1. The extracted streams 121, 123 are at a pressure of 75 Bar and a temperature of −32deg C., and are returned at a temperature of −53deg C. after having exchanged heat in heat exchanger E3 with an acid-gas rich MeOH stream. This acid-gas rich MeOH stream 114 includes condensed $CO_2$ (62 wt %) and MeOH absorbed $CO_2$ 36 wt % stream which has been recovered from the base of the absorber column A1, expanded in expander EX1 and flashed over a valve V1 to give a MeOH stream at a pressure of 5 Bar and a temperature of −56deg C.

After the MeOH stream 114 is warmed in the heat exchanger E3, it is passed to heat exchanger E1 after separator drum F2 for partially disengaged $CO_2$ and being flashed over a further valve V2 to give a rich MeOH stream 117 at a pressure of 4 Bar and a temperature of −55 deg C.

After being warmed in the heat exchanger E1, the MeOH stream 118 is passed to separator drum F1 from which disengaged $CO_2$ rich vapor is separated as stream 131. The lean MeOH stream 141 is returned through drum F1, pump P1 and heat exchanger E1 to the absorber A1.

The $CO_2$ rich vapour stream 131 recovered from the separator drum F1 is compressed using compressor C1, before passing the compressed stream 132 to the heat exchanger E1, the compression providing further heat input into the heat exchanger E1 in a manner similar to that described above in relation to FIG. 2. The cooled stream 133 is then passed to a further separation drum F2 in which condensed MeOH is recovered.

Upstream of the valve V1, $CO_2$ rich vapour stream 106, recovered from separator drum F5, is then compressed in compressor C5 and returned to the inlet of the acid gas feed stream to heat exchanger E1.

In comparison with a conventional MeOH absorption system, for example a Rectisol system, having $CO_2$ absorption without condensation of the acid gas, the present system is more compact. The MeOH flow may be ⅓ to ¼ of that of a conventional system and the absorber cross section may also be ⅓ to ¼ of that of the conventional system. The required MeOH flow is affected by absorption column temperature, in that the lower the temperature, the lower the flow, and thus cooling of the column become important. Since a conventional system requires an external refrigeration system for cooling, the column cooling in a conventional system is considered to be less efficient than examples of the present invention. Furthermore there is no requirement for steam heating or external refrigeration in examples of the present invention which is more self-contained. It is also considered that examples of the present system require about 30% less power than a conventional system. Although a direct comparison is difficult in some cases because conventional power depends on a refrigeration scheme which is not required in the present system. However, a power reduction is expected for many examples.

Figure 6:
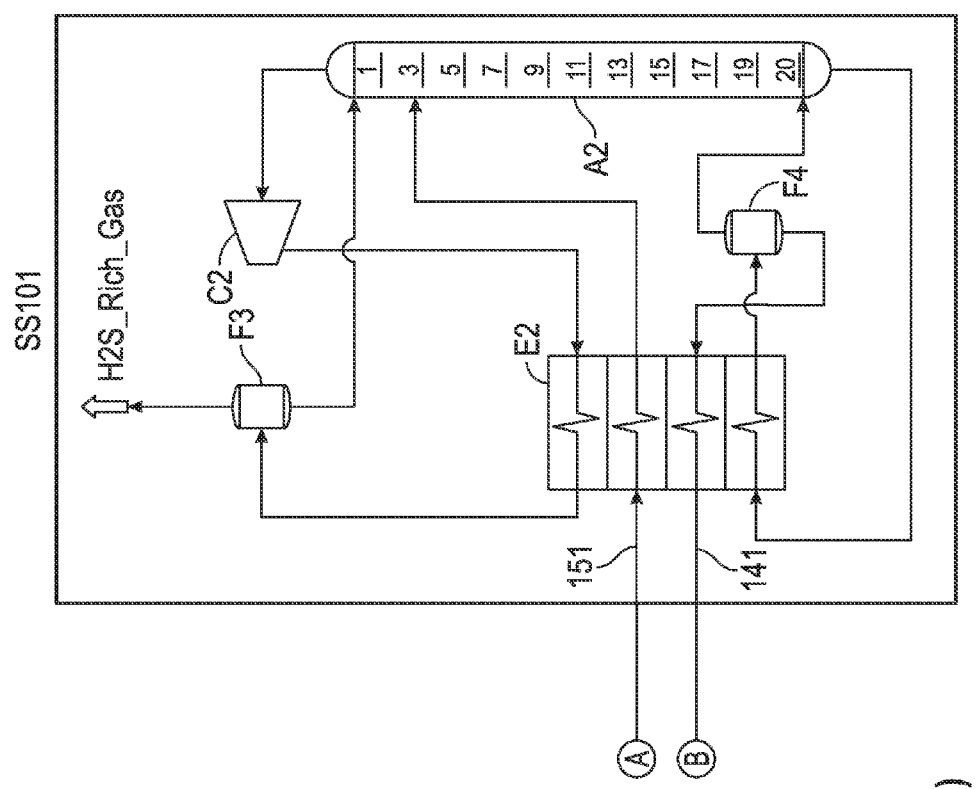
FIG. 6 shows schematically an example of the invention in which autothermal acid gas removal is used to remove carbon dioxide and hydrogen sulphide from a gas stream using MeOH as absorbent.

FIG. 6 shows schematically an example of the invention in which autothermal acid gas removal is used to remove $CO_2$ and $H_2S$ from a gas stream using MeOH as absorbent;

The system shown in FIG. 6 is similar to that of FIG. 5 except that a wash column A3 is included similar to FIG. 4 described above. The principle of the key features of this example is that supplying wash MeOH to the wash column as pure or unsaturated with $CO_2$ tends the wash MeOH to absorb $CO_2$ which raises the wash column temperature resulting in $H_2S$ break through. To reduce this, substantially $H_2S$-free $CO_2$ liquid (which is produced in the system through a side stream of output $CO_2$) is supplied to the wash column top to pre-saturate the MeOH with $CO_2$ liquid (without temperature rise). This enables the wash to proceed with little or no $CO_2$ absorption and therefore little or no temperature rise.

In relation to the process of FIG. 6, acid syngas is supplied at 75 Bar to the heat exchanger E1 where it is cooled to −50deg C. to form stream 101 which is passed to the base of the absorber column A1. In this example 62% of the $CO_2/H_2S$ is phase change condensed. The remaining $H_2S$ is absorbed by approximately ⅓ of the MeOH which is nearly $CO_2$ saturated in lower section of the column A1. $CO_2$ saturation in the upper section of the column A1 enables efficient $H_2S$ absorption with little temperature rise. Remaining $CO_2$ is absorbed by lean MeOH in the upper sections of the column A1. High pressure and low temperature minimises MeOH flow and heat is removed by two pairs of draw/return stream 121,122 and 123, 124 which remove MeOH from the absorber column and pass it through heat exchanger E3 for cooling against a cold MeOH stream 114. At the top of the column, $CO_2$ lean and $H_2S$ free syngas is returned. Lean MeOH is supplied to the top of the column from the regeneration system.

An additional draw stream 125 is taken from the absorber column A1 for wash MeOH. This comprises about ⅔ of MeOH free of $H_2S$ which is extracted and then cooled by expansion across EX2 and valve V3 before being passed to the wash column A3.

At the base of the absorber column A1, $CO_2/H_2S$ exit as a liquid together with the MeOH, and are expanded across expander EX1 and valve V1 before being passed to the heat exchanger E3 where they are evaporated and then passed to the wash column. From the base of the wash column A3, sour MeOH is flash cooled across valve V2 before being passed to a further heat exchanger E1. Gradual $CO_2/H_2S$ evaporation h-T matches closely to the syngas condensation h-T through the heat exchanger E1. The evaporated $CO_2/H_2S$ from E1 is separated and returned through a drum F1, compressor C1 and heat exchanger E1 to the wash column A3. The $H_2S$ is concentrated in this loop so that MeOH separated at the drum F1 contains Claus compatible $H_2S/CO_2$ ratio acid gas.

The separated MeOH stream 151 is passed to reboiling and condensation sub-system SS101 with arrangements the same as sub-system SS01 in FIG. 3 where Claus compatible $H_2S$ rich gas and lean MeOH are produced. Because MeOH does not exhibit strong $H_2S$ selective bonding, MeOH stripping does not require a sub-system similar to SS02 in FIG. 4.

$H_2S$ free $CO_2$ liquid at 138 is supplied to the wash column A3 for saturating $CO_2$ rich MeOH with $CO_2$ liquid. At the top of the wash column, stream 134 comprises substantially $H_2S$ free $CO_2$. $CO_2$ saturation using the stream 134 enables there to be substantially no $CO_2$ absorption giving an efficient substantially constant temperature $H_2S$ wash, in this example at about −50deg C. In comparison with a conventional MeOH absorption system, examples of the present invention are more efficient and more self-contained as described in the FIG. 5 section.

FIG. 7 shows schematically an example of the invention in which autothermal acid gas removal is used to remove $H_2S$ from a gas stream using MeOH as absorbent;

In this example, $H_2S$ is to be removed using MeOH and condensation/phase change without significant $CO_2$ removal. Such a method may for example find application where the resulting gas is to be used as a fuel.

Acid gas is co-captured in a similar way to other examples described with FIG. 5 and rich methanol is stripped using a stripping column as described with FIG. 6. In this example, it is possible to reduce the MeOH flow to about ⅓ of the $CO_2$ capture system because only $H_2S$ 100% capture is required. Acid gas separated through the regeneration process is returned to the main stream. In this example, instead of simply compressing and returning the acid gas, the stream is passed to a heat exchanger for liquefaction and then to the main stream. The injection of liquid acid gas provides direct spray cooling and significantly reduces the stream temperature. This can eliminate the need for source gas condensation heat exchange at low temperature in some examples and can improve the efficiency of the system.

The co-capture absorber column A1 operates at 75 Bar and −50deg C. Feed acid gas is cooled through a heat exchanger E1 to a temperature of −40deg C. at a pressure of 75 Bar. Liquid $CO_2$ stream 133 is injected into the feed stream to form a stream 101 at −55deg C. which is passed to the absorber column A1.

Lean MeOH is supplied to the top of the absorber column A1 and the supply flow is Reduced to ⅓ of the $CO_2$ capture example above as only $H_2S$ removal is required in this example. Since the flow of MeOH is low in the absorber column A1, the MeOH is soon saturated with $CO_2$ and $CO_2$ slippage occurs. This is desirable where no $CO_2$ removal is required. The $H_2S$ is absorbed by the $CO_2$ saturated MeOH in the column with a small temperature rise because the $CO_2$ saturation at the top of the column enables efficient $H_2S$ absorption. $CO_2$ and $H_2S$ exit the absorber column A1 as a liquid together with the MeOH as stream 111 and are passed to heat exchanger E3.

Two pairs of draw/return streams 121, 122 and 123, 124 are withdrawn from and returned to the middle of the absorber column A1 via heat exchanger E3. A small amount of $CO_2$/$H_2S$ is evaporated through heat exchanger E3 because there has been only a small amount of heat generation in the absorber column A1. Downstream of heat exchanger E3, the sour MeOH stream 113 is flash cooled over a valve V2 and passed to a further heat exchanger E1. The gradual $CO_2$/$H_2S$ evaporation H-T matches closely the incoming feed gas condensation H-T through the heat exchanger E1.

The evaporated $CO_2$/$H_2S$ is separated in a drum F1, compressed in compressors C1 and returned via heat exchanger E1 to the main stream at manifold M1. The $H_2S$ is concentrated in this loop. The $H_2S$ rich acid gas containing MeOH is delivered from the separator drum F1 to the stripping subsystem SS101 similar to that of FIG. 6.

The recovered $CO_2$/$H_2S$ from the compressors C1 is liquefied due to the high pressure of 75 Bar and low temperature of −40deg C. As described above, the liquefied acid components are then returned to the gas stream to provide direct spray injection, giving a large cooling effect.

In comparison with conventional MeOH systems for $H_2S$ removal, the system of FIG. 7 can be self-contained in that no steam input or external refrigeration is required. It can also require less power than for a conventional MeOH system.

It will be understood that different apparatus may be used for separating the absorbent and acid gas in examples of aspects of the invention. In the present examples, the use of a separator drum and a stripper column are described. Other alternative apparatus or combinations may be used, as appropriate.

It will be further understood that different apparatus may be used for effecting heat exchange between streams in the systems of examples of the present invention. In examples described herein, multichannel heat exchangers are described. In other examples, more than one heat exchanger element may be provided to effect the desired heat exchange between the streams. One or more of those heat exchanger elements may be thermally connected together. In relation to FIG. 3, the two heat exchangers described E1 and E2 may be thermally connected. Heat exchanger apparatus other than multichannel heat exchangers will be apparent to the skilled person and may be used in examples of the invention as appropriate.

It will be understood that the present invention has been described above purely by way of example, and modification of detail can be made within the scope of the invention.

Each feature disclosed in the description, and (where appropriate) the claims and drawings may be provided independently or in any appropriate combination.

What is claimed is:

1. A method of separating acid components from a source fluid, the method comprising:
   passing the source fluid through an absorbent in an absorber column;
   absorbing acid component from the source fluid with the absorbent to form an acid-depleted fluid and an acid-rich absorbent;
   drawing a draw/return stream from the absorber column to a heat exchange system;
   cooling the draw/return stream in the heat exchange system and returning the draw/return stream from the heat exchange system to the absorber column;
   passing the acid-rich absorbent to the heat exchange system and a first regeneration unit comprising a separation apparatus;
   separating at least some of the acid component from the acid-rich absorbent in the separation apparatus to form a regenerated absorbent and an acid-rich vapour;
   compressing at least a part of the acid-rich vapour generated in the separation apparatus to form compressed acid-rich vapour;
   passing the compressed acid-rich vapour to the heat exchange system;
   wherein the heat exchange system facilitates the exchange of heat between at least a part of each of the following streams:
   (i) the acid-rich absorbent;
   (ii) the compressed acid-rich vapour;
   (iii) the regenerated absorbent; and
   (iv) the draw/return stream.

2. The method of claim 1, wherein the method is substantially autothermal.

3. The method of claim 1, further comprising:
heat balancing the absorption of the acid component from the source fluid and the separation of the acid component from the acid-rich absorbent in the separation apparatus without external refrigeration or external heat input.

4. The method of claim 1, further comprising:
passing the regenerated absorbent from the first regeneration unit to a second regeneration unit in series with the first regeneration unit; and
removing more of the acid component from the regenerated absorbent in the second regeneration unit.

5. The method of claim 1, wherein the regenerated absorbent from the first regeneration unit is a semi-rich absorbent, and wherein the method further comprises:
passing the semi-rich absorbent to a heat exchanger and a stripping column;
removing more of the acid component from the semi-rich absorbent in the stripping column;
recovering the absorbent from the stripping column and recovering an acid-rich vapour from the stripping column;
partially reboiling the absorbent recovered from the stripping column through a heat exchanger to form a reboiled absorbent and a reboiled acid-rich vapour;
separating the reboiled acid-rich vapour from the reboiled absorbent;
passing the separated reboiled acid-rich vapour back to the stripping column and cooling the separated reboiled absorbent;
compressing the recovered acid-rich vapour from the stripping column to form a compressed acid-rich vapour;
cooling the compressed acid-rich vapour; and
exchanging heat between least a part of each of the following streams:
(a) the semi-rich absorbent;
(b) the compressed acid-rich vapour;
(c) the reboiled absorbent; and
(d) the absorbent recovered from the stripping column.

6. The method of claim 1, wherein the acid gas comprises carbon dioxide and hydrogen sulphide.

7. The method of claim 6, wherein a carbon dioxide-rich/hydrogen sulphide lean absorbent is extracted from the acid-rich absorbent recovered from the absorber column; wherein the extracted carbon dioxide-rich/hydrogen sulphide lean absorbent is passed to a wash column downstream of the absorber column to recover hydrogen sulphide lean carbon dioxide.

8. The method of claim 5, further comprising supplying carbon dioxide to the second regeneration unit.

9. The method of claim 6, further comprising supplying carbon dioxide to the stripper column.

10. The method of claim 1, further comprising cooling or compressing a process stream such that a two-phase stream is formed.

11. The method of claim 7, further comprising pre-saturating the extracted carbon dioxide-rich/hydrogen sulphide lean absorbent with carbon dioxide before passing the extracted carbon dioxide-rich/hydrogen sulphide lean absorbent through the wash column.

12. The method of claim 1, further comprising:
compressing, cooling or liquefying the acid-rich vapour to form a recycle acid stream; and
passing the recycle acid stream into the source fluid upstream of the absorbent.

13. The method of claim 12, wherein the acid-rich vapour stream is liquefied to form a liquid recycle acid stream and the liquid recycle acid stream is injected into a process stream.

14. The method of claim 1, wherein the absorbent includes a chemical solvent.

15. The method of claim 1, wherein the absorbent includes a physical solvent.

16. The method of claim 1, wherein carbon dioxide is removed from the source fluid.

17. A method for removing acid components from a source fluid, the method comprising:
passing the source fluid through an absorbent in an absorber column;
absorbing acid component from the source fluid with the absorbent to form an acid-depleted fluid and an acid-rich absorbent;
cooling the absorbent in the absorber column;
passing the acid-rich absorbent to a regeneration unit and removing at least some of the acid component from the acid-rich absorbent to form a regenerated absorbent and an acid-rich vapour;
compressing at least a part of the acid-rich vapour generated in the regeneration unit to form a compressed acid-rich vapour;
passing the compressed acid-rich vapour to a heat exchange system;
wherein the heat exchange system facilitates the exchange of heat between at least a part of each of the following streams:
(i) the acid-rich absorbent;
(ii) the compressed acid-rich vapour; and
(iii) the regenerated absorbent.

18. A system for removing acid components from a source fluid using an absorbent, the apparatus comprising:
an absorber column comprising an absorbent configured to absorb the acid component from the source fluid to form an acid-depleted fluid and an acid-rich absorbent;
a heat exchange system;
a draw/return path extending from the absorber column to the heat exchange system, wherein the draw/return path is configured to pass the absorbent from the absorber column to the heat exchanger and return a draw/return stream from the heat exchanger to the absorber column;
a path extending from the absorber column to the heat exchange system, wherein the path is configured to pass the acid-rich absorbent from the absorber column to the heat exchange system;
a first regeneration unit comprising a separation apparatus coupled to the absorber column and configured to separate at least some of the acid component from the acid-rich absorbent to form a regenerated absorbent and an acid-rich vapour;
a compressor coupled to the separation apparatus and the heat exchanger, wherein the compressor is configured to compress at least a part of the acid-rich vapour generated in the separation apparatus to form a compressed acid-rich vapour and pass the compressed acid-rich vapour to the heat exchange system;
wherein the heat exchange system is configured to exchange heat between at least a part of each of the following:
(i) the acid-rich absorbent;
(ii) the compressed acid-rich vapour;
(iii) the regenerated absorbent; and
(iv) the draw/return stream from the absorber column.

* * * * *